US010833625B2

(12) United States Patent
Dubensky et al.

(10) Patent No.: US 10,833,625 B2
(45) Date of Patent: Nov. 10, 2020

(54) SYSTEMS AND METHODS FOR CONTROLLING FAN MOTORS WITH VARIABLE FREQUENCY DRIVES

(71) Applicant: Johnson Controls Technology Company, Plymouth, MI (US)

(72) Inventors: Harold J. Dubensky, Columbia, PA (US); James K. Spitzer, York, PA (US); Roderick Ray Sentz, Spring Grove, PA (US); Kevin R. Stockton, York, PA (US)

(73) Assignee: Johnson Controls Technology Company, Auburn Hills, MI (US)

(*) Notice: Subject to any disclaimer, the term of this patent is extended or adjusted under 35 U.S.C. 154(b) by 0 days.

(21) Appl. No.: 15/614,405

(22) Filed: Jun. 5, 2017

(65) Prior Publication Data

US 2018/0102726 A1    Apr. 12, 2018

Related U.S. Application Data

(60) Provisional application No. 62/404,983, filed on Oct. 6, 2016.

(51) Int. Cl.
*H02P 29/10* (2016.01)
*H02P 27/06* (2006.01)
(Continued)

(52) U.S. Cl.
CPC ............ *H02P 29/10* (2016.02); *F04D 27/004* (2013.01); *F24F 11/30* (2018.01); *F24F 11/62* (2018.01);
(Continued)

(58) Field of Classification Search
CPC .... F24F 11/0079; F24F 11/001; F24F 11/006; F24F 2011/00; F25B 2600/11; F25B 2600/025; F25B 2600/0253; F25B 30/02; F25B 49/025; F25B 2600/021; Y02B 30/741; Y02B 30/746; Y02B 30/767; Y02B 60/50
See application file for complete search history.

(56) References Cited

U.S. PATENT DOCUMENTS 4,227,136 A * 10/1980 Roesel, Jr. ........... H02K 21/046
318/701
4,656,553 A * 4/1987 Brown ..................... H02P 6/08
318/254.1
(Continued)

FOREIGN PATENT DOCUMENTS

WO    2017178067 A1    10/2017

OTHER PUBLICATIONS

Lennox_CBX4OUHV_IOM 2011.*
(Continued)

*Primary Examiner* — Bickey Dhakal
(74) *Attorney, Agent, or Firm* — Fletcher Yoder, P.C.

(57) ABSTRACT

A fan assembly is provided. The fan assembly includes a fan, a motor that is coupled to the fan, and a variable frequency drive (VFD) that is coupled to the motor. The motor includes a maximum rated speed that is greater than a maximum structural speed limit of the fan, and the VFD includes a current output limit configured to limit an operational speed of the motor to be less than or equal to the maximum structural speed limit of the fan.

23 Claims, 6 Drawing Sheets (51) Int. Cl.
*F24F 11/63* (2018.01)
*F24F 11/30* (2018.01)
*F24F 11/77* (2018.01)
*F24F 11/62* (2018.01)
*F04D 27/00* (2006.01)

(52) U.S. Cl.
CPC .............. *F24F 11/63* (2018.01); *F24F 11/77* (2018.01); *F05D 2270/335* (2013.01); *H02P 27/06* (2013.01)

(56) References Cited

U.S. PATENT DOCUMENTS

| | | | | |
|---|---|---|---|---|
| 4,980,624 | A * | 12/1990 | Bernhardt | H02H 6/00 318/434 |
| 6,429,612 | B1 * | 8/2002 | Kume | H02P 3/18 318/139 |
| 6,983,653 | B2 * | 1/2006 | Iwaki | G01F 1/692 73/204.23 |
| 7,081,733 | B2 * | 7/2006 | Han | F24F 11/0079 318/34 |
| 7,405,553 | B1 * | 7/2008 | Kattoju | H02J 9/06 324/764.01 |
| 7,800,339 | B2 | 9/2010 | Gonzalez et al. | |
| 7,925,385 | B2 | 4/2011 | Stavale et al. | |
| 7,945,411 | B2 * | 5/2011 | Kernan | F04D 27/001 702/100 |
| 7,952,316 | B2 * | 5/2011 | Ganev | H02P 25/22 318/524 |
| 8,054,033 | B2 * | 11/2011 | Kern | H02P 6/182 318/400.05 |
| 8,143,819 | B2 | 3/2012 | Burd et al. | |
| 8,303,260 | B2 * | 11/2012 | Stavale | F04D 15/0088 417/20 |
| 8,303,297 | B2 * | 11/2012 | Tompkins | F23N 1/022 431/12 |
| 8,421,395 | B2 | 4/2013 | Maeda et al. | |
| 8,487,572 | B2 * | 7/2013 | Kern | H02P 6/182 318/400.35 |
| 8,515,584 | B2 | 8/2013 | Miller et al. | |
| 8,598,823 | B2 * | 12/2013 | Rollins | F04D 19/00 318/400.41 |
| 8,672,733 | B2 | 3/2014 | Chen et al. | |
| 8,849,463 | B2 * | 9/2014 | Hopkins | F04D 25/166 700/276 |
| 9,093,934 | B2 | 7/2015 | Stout et al. | |
| 9,121,628 | B2 * | 9/2015 | Chen | F25B 30/02 |
| 9,228,750 | B2 | 1/2016 | Rockenfeller et al. | |
| 9,328,946 | B2 * | 5/2016 | Chen | F25B 30/02 |
| 9,823,022 | B2 * | 11/2017 | Rollins | F28D 1/024 |
| 2005/0019162 | A1 * | 1/2005 | Delano | F04D 27/002 416/1 |
| 2005/0019164 | A1 * | 1/2005 | Delano | F04D 27/00 416/61 |
| 2005/0115258 | A1 * | 6/2005 | Violand | F24F 11/77 62/186 |
| 2006/0061321 | A1 * | 3/2006 | Han | F24F 11/0079 318/801 |
| 2006/0083490 | A1 * | 4/2006 | Simofi-Ilyes | H02P 5/68 388/806 |
| 2006/0201278 | A1 * | 9/2006 | Pizzichil | F16H 57/033 74/640 |
| 2007/0032187 | A1 | 2/2007 | Liu | |
| 2007/0212229 | A1 * | 9/2007 | Stavale | F04D 15/0088 417/42 |
| 2007/0289322 | A1 * | 12/2007 | Mathews | F24F 11/77 62/225 |
| 2009/0111065 | A1 * | 4/2009 | Tompkins | F23N 1/022 431/12 |
| 2010/0102766 | A1 * | 4/2010 | Kern | H02P 6/182 318/400.35 |
| 2011/0014061 | A1 * | 1/2011 | Hopkins | F04D 25/166 417/3 |
| 2011/0030414 | A1 | 2/2011 | Newell et al. | |
| 2011/0149678 | A1 | 6/2011 | Southwick et al. | |
| 2011/0291597 | A1 * | 12/2011 | Kern | H02P 6/20 318/400.11 |
| 2012/0013280 | A1 * | 1/2012 | Kern | H02P 6/182 318/400.04 |
| 2012/0090337 | A1 * | 4/2012 | Chen | F25B 30/02 62/79 |
| 2012/0244015 | A1 * | 9/2012 | Benson | F04D 25/166 417/53 |
| 2013/0189129 | A1 * | 7/2013 | Genereux | F04D 29/666 417/313 |
| 2014/0034284 | A1 | 2/2014 | Butler et al. | |
| 2014/0318283 | A1 * | 10/2014 | Alfekri | G01N 17/00 73/865.6 |
| 2015/0030469 | A1 * | 1/2015 | Hopkins | F04D 25/166 417/53 |
| 2015/0039139 | A1 * | 2/2015 | Meeuwsen | G05D 19/02 700/280 |
| 2015/0162858 | A1 * | 6/2015 | Wajima | H02P 6/04 318/494 |
| 2015/0321298 | A1 * | 11/2015 | Chen | F25B 30/02 29/890.035 |
| 2016/0069624 | A1 * | 3/2016 | Rollins | F04D 25/028 415/122.1 |
| 2017/0090438 | A1 | 3/2017 | Liu | |

OTHER PUBLICATIONS

CBX4OUHV Air Handler Lennox Oct. 2013.*
Lennox CBX4OUHV Aug. 2015.*
Carnovale et al., Energy Savings—Realistic Expectations for Commercial Facilities, Power Protection Products, Inc., Jul. 2015, 16 pgs.
Waide et al., Energy-Efficiency Policy Opportunities for Electric Motor-Driven Systems, Energy Efficiency Series, International Energy Agency, 2011, 132 pgs.

* cited by examiner

SYSTEMS AND METHODS FOR CONTROLLING FAN MOTORS WITH VARIABLE FREQUENCY DRIVES

CROSS REFERENCE TO RELATED APPLICATIONS

This application claims priority from and the benefit of U.S. Provisional Application Ser. No. 62/404,983, entitled "FAN MOTOR CONTROLLED WITH CURRENT AND FREQUENCY LIMITING VFD," filed Oct. 6, 2016, which is hereby incorporated by reference.

BACKGROUND

The present disclosure relates generally to heating, ventilating, and air conditioning systems. A wide range of applications exist for heating, ventilating, and air conditioning (HVAC) systems. For example, residential, light commercial, commercial, and industrial systems are used to control temperatures and air quality in residences and buildings. Such systems often are dedicated to either heating or cooling, although systems are common that perform both of these functions. Very generally, these systems operate by implementing a thermal cycle in which fluids are heated and cooled to provide the desired temperature in a controlled space, typically the inside of a residence or building. Similar systems are used for vehicle heating and cooling, and as well as for general refrigeration.

In many HVAC systems, a fan associated with the HVAC system may be driven by a motor. However, in certain applications, the motor may be able to operate at a speed that is greater than a speed at which the fan is configured to be driven or physically capable of being driven.

SUMMARY

The present disclosure relates to a fan assembly that includes a fan, a motor that is coupled to the fan, and a variable frequency drive (VFD) that is coupled to the motor. The motor includes a maximum rated speed that is greater than a maximum structural speed limit of the fan, and the VFD includes a current output limit configured to limit an operational speed of the motor to be less than or equal to the maximum structural speed limit of the fan.

The present disclosure also relates to a fan assembly that includes a fan and a variable frequency drive (VFD) that is coupled to an AC induction motor. The AC induction motor includes a maximum rated speed, and the maximum rated speed is greater than a maximum structural speed limit of the fan. The VFD includes a current output limit configured to limit an operational speed of the AC induction motor to be less than or equal to the maximum structural speed limit of the fan. The fan assembly also includes a controller configured to control the fan assembly via a processor. The controller includes a user interface configured to receive user input regarding one or more operational settings of the fan assembly.

The present disclosure further relates to a method of operating a fan assembly that includes receiving, via a processor, user input regarding at least one operational setting of the fan assembly. The fan assembly includes a fan. Also, the method includes determining, via the processor, electrical power settings based on the user input. Additionally, the method includes sending, via the processor, a command to a variable frequency drive to provide electrical power with the electrical power settings to an alternating current induction motor, wherein the AC induction motor is coupled to the fan.

DETAILED DESCRIPTION

The present disclosure is directed to heating, ventilating, and air conditioning (HVAC) systems and components of HVAC systems that include a variable frequency drive (VFD) that may limit the frequency, voltage, current, or a combination thereof of electrical power that is delivered to a motor in the HVAC system. In general, HVAC systems may include fan wheels, air handlers, or fans that are driven by motors that may operate at a speed that is greater than a speed at which the fan wheels, air blowers, or fans are configured to be driven. A VFD may be incorporated into the HVAC system to limit the electrical power that is delivered from the VFD to a motor, such that the motor operates at a speed that is less than or equal to the maximum speed at which the fan wheels, air blowers and/or fans are configured or designed to operate.

Figure 1:
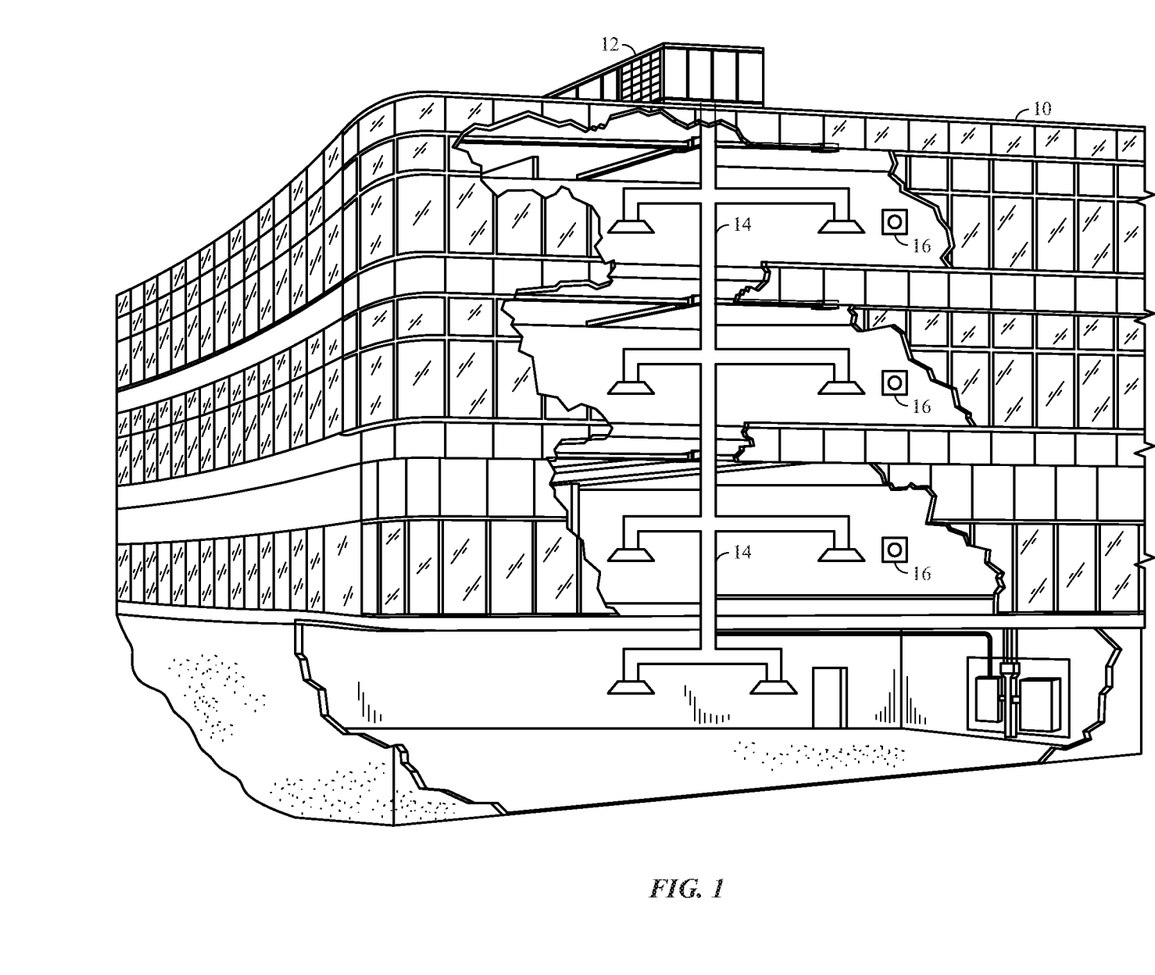
FIG. 1 is a perspective view a heating, ventilating, and air conditioning (HVAC) system for building environmental management, in accordance with embodiments described herein.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
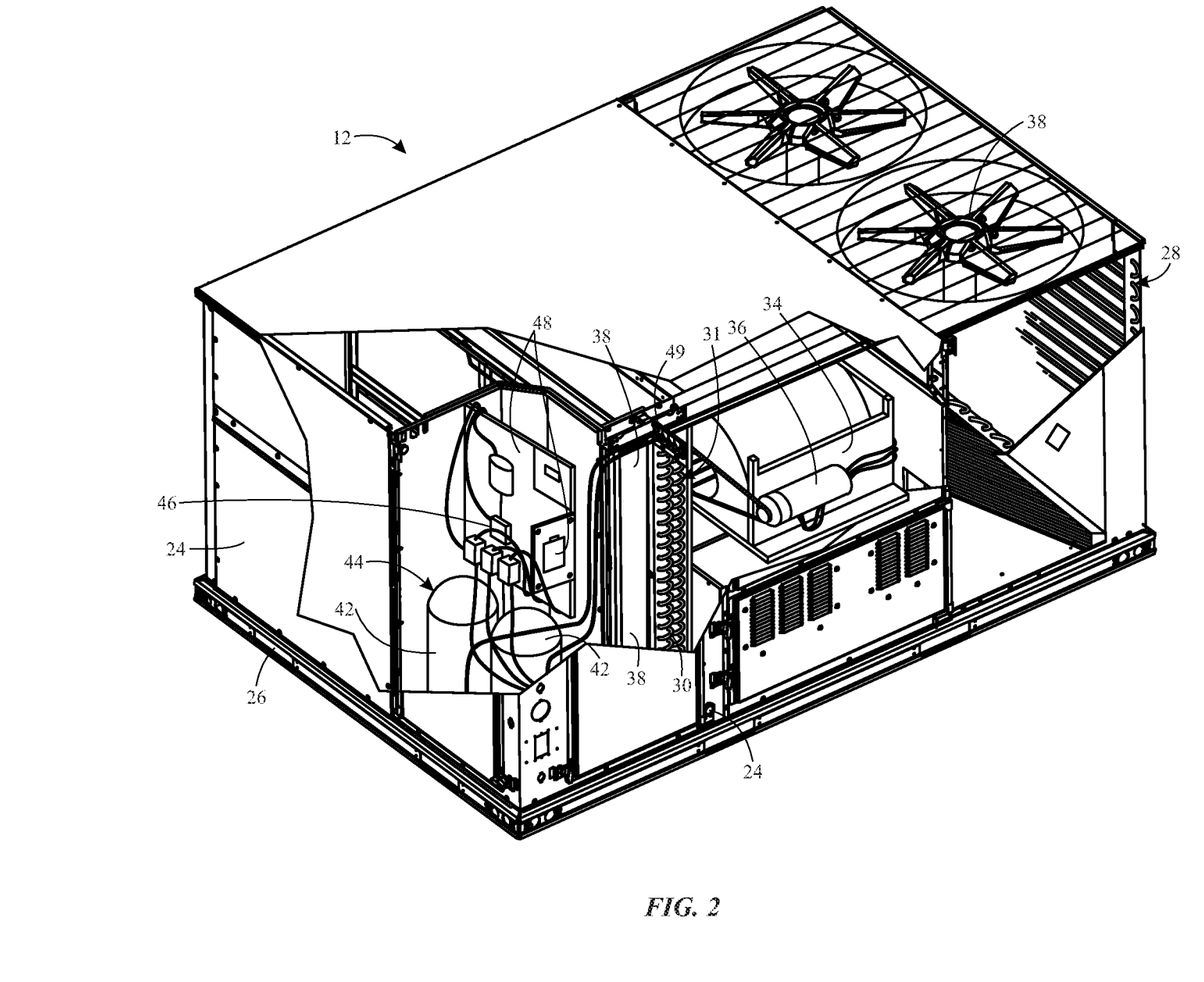
FIG. 2 is a perspective view of the HVAC unit of FIG. 1, in accordance with embodiments described herein.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant (for example, R-410A, steam, or water) through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms (one or more being referred to herein separately or collectively as the control device 16). The control circuitry may be configured to control operation of the equipment, provide alarms, and monitor safety switches. Wiring 49 may connect the control board 48 and the terminal block 46 to the equipment of the HVAC unit 12.

Figure 3:
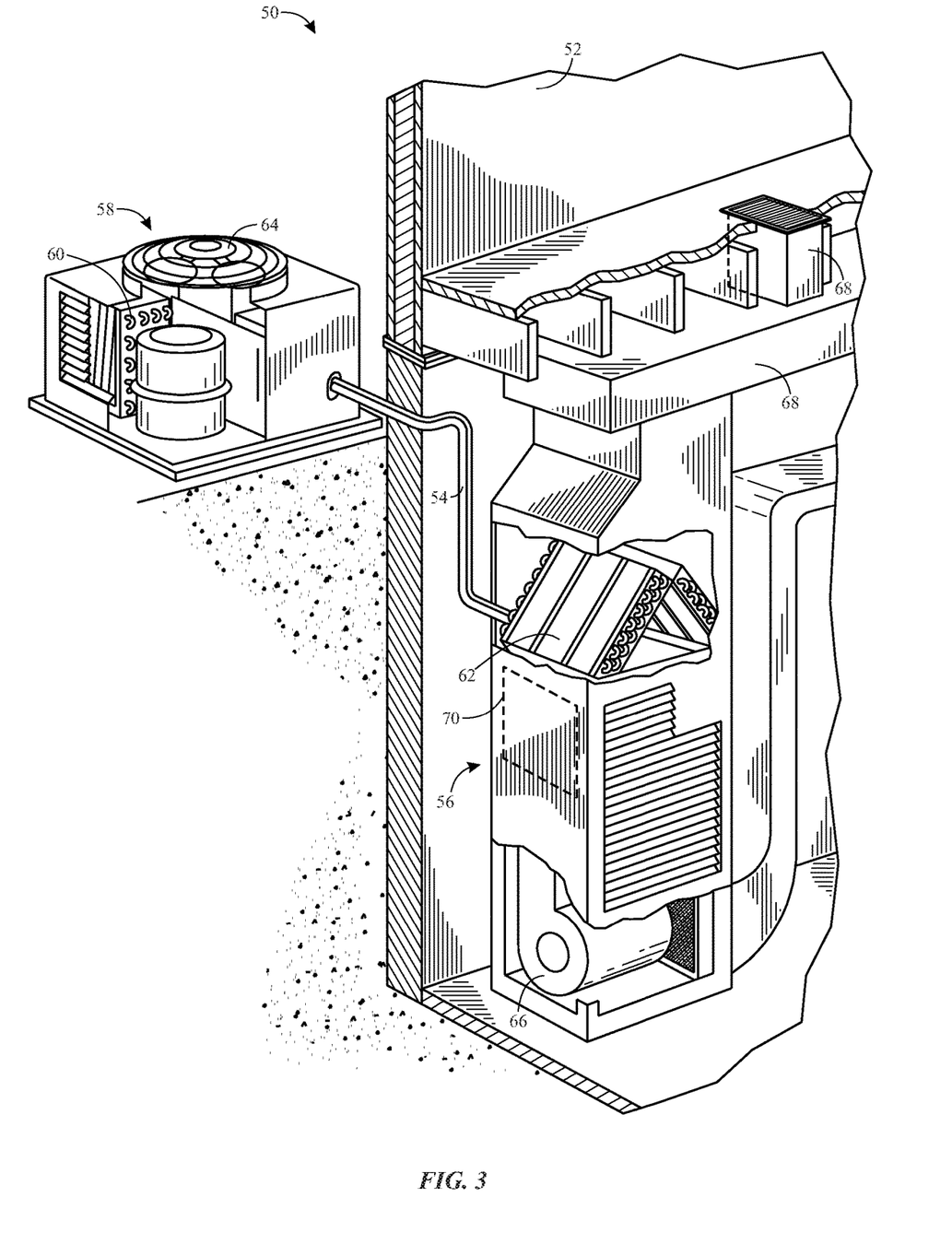
FIG. 3 is a perspective view of a residential heating and cooling system, in accordance with embodiments described herein.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant (which may be expanded by an expansion device, not shown) and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat (plus a small amount), the residential heating and cooling system 50 may become operative to refrigerate additional air for circulation through the residence 52. When the temperature reaches the set point (minus a small amount), the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger (that is, separate from heat exchanger 62), such that air directed by the blower 66 passes over the tubes or pipes and extracts heat from the combustion products. The heated air may then be routed from the furnace system 70 to the ductwork 68 for heating the residence 52.

Figure 4:
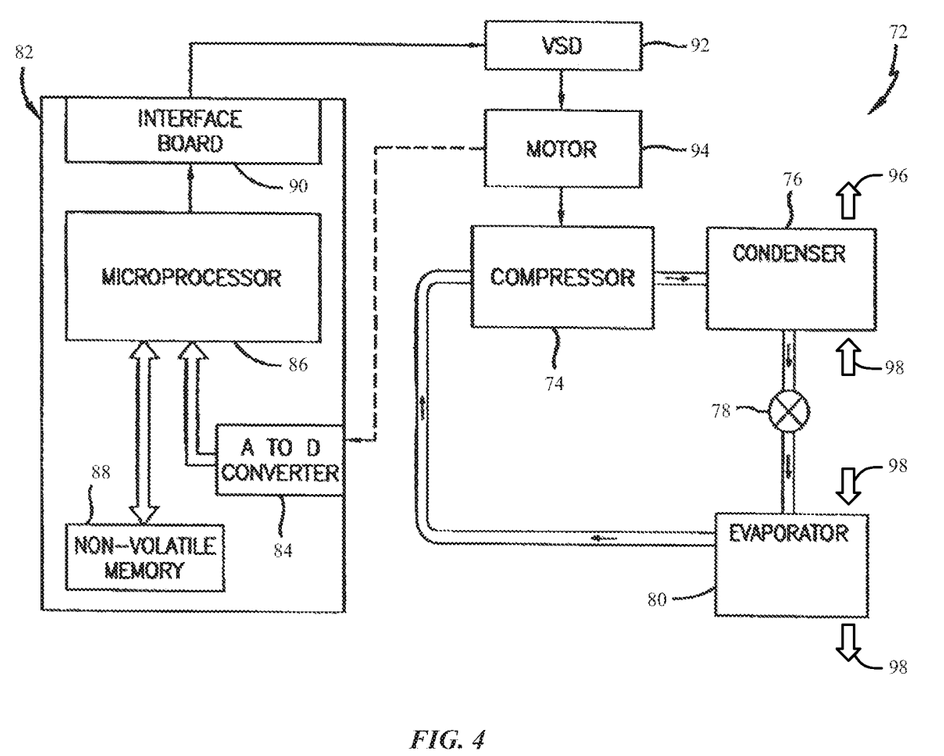
FIG. 4 is a schematic diagram of a vapor compression system that may be used in the HVAC system of FIG. 1 and the residential heating and cooling system FIG. 3, in accordance with embodiments described herein.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As discussed below, a variable frequency drive (VFD) may be incorporated into the HVAC system to limit the electrical power that is delivered from the VFD to a motor, such that the motor operates at a speed that is less than or equal to the maximum speed at which the air blowers and/or fans are configured or designed to operate. It should be noted that each of the systems discussed above may include one or more VFD in accordance with the discussion below. That is, a VFD may be implemented into the systems discussed above and utilized to limit electrical power that is delivered to a motor that drives an air blower or fan.

Figure 5:
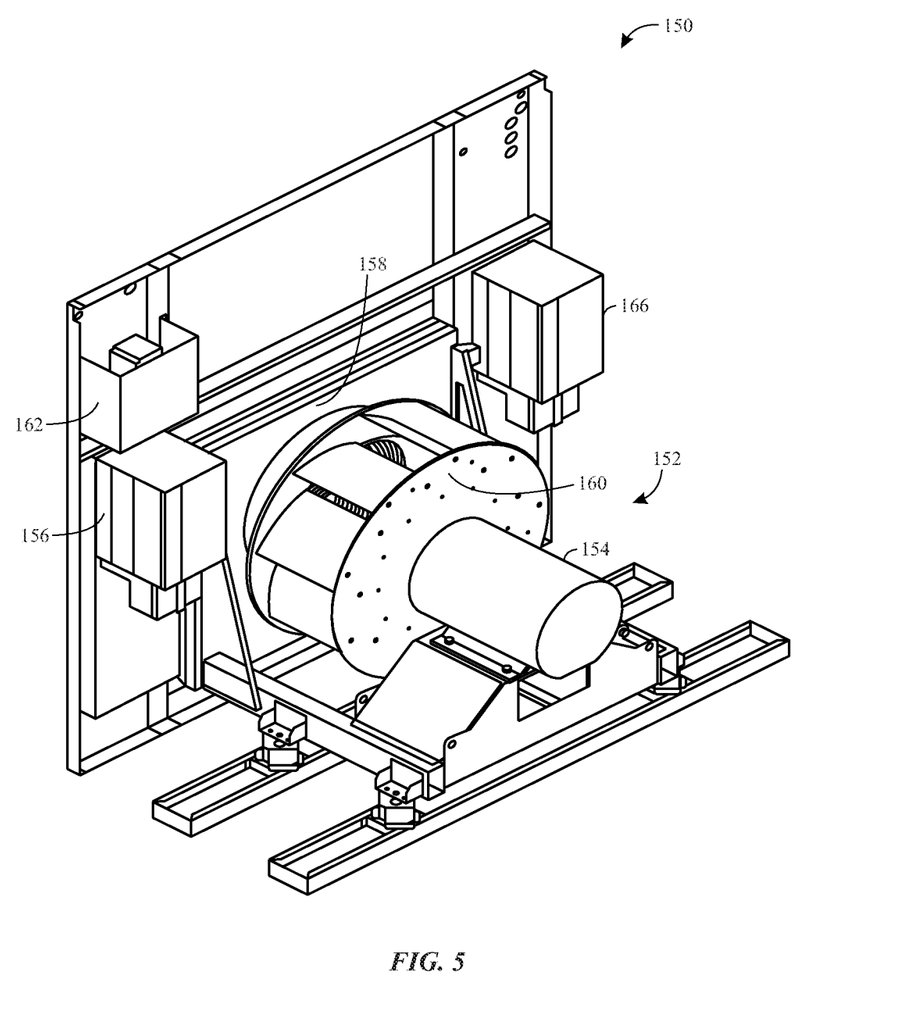
FIG. 5 is a perspective view of a fan assembly that includes a motor that may have an operational speed that is limited by a variable frequency drive (VFD), in accordance with embodiments described herein.

FIG. 5 is a perspective view of a fan assembly 150, which includes a fan and motor assembly 152 that includes a motor 154 that may have an operational speed that is limited by a VFD 156. The fan assembly 150 may be part of an air handler. Air (e.g., cooled, heated, or ambient air) may enter the fan and motor assembly 152 via an inlet panel 158. The air may pass through the inlet panel 158 and enter an air supply fan, such as a fan wheel 160, which may be coupled to, and driven by, the motor 154. As the fan wheel 160 rotates, the air may exit the fan wheel 160 (e.g., via a housing) and be directed to an area to be heated or cooled.

The motor 154 may be a three-phase AC induction motor. More specifically, the motor 154 may be a two pole, four pole, six pole, eight pole, or ten pole induction motor. The motor 154 may also have a maximum rated speed. The maximum rated speed is the maximum speed at which the motor 154 may operate. Typically, the maximum rated speed is related to the number of poles the motor 154 has, as well as the frequency of the three-phase power that is supplied to the motor 154. More specifically, the relationship between the maximum rated speed, number of poles of the motor 154, and the frequency of the power supplied to the motor 154 can be described with the following equation:

$$S_{max} = \frac{120f}{n}$$

where $S_{max}$ is the maximum rated speed in rotations per minute (rpm) of the motor 154, f is the frequency (in hertz) of the power supplied to the motor 154, and n is the number of poles of the motor 154. For example, if the motor 154 is supplied by three-phase power with a frequency of sixty hertz, the motor 154 may have a maximum rated speed of 3600 rpm if the motor 154 is a two pole motor, 1800 rpm if the motor 154 is a four pole motor, 1200 rpm if the motor 154 is a six pole motor, 900 rpm if the motor 154 is an eight pole motor, and 720 rpm if the motor 154 is a ten pole motor. As another example, if the motor 154 is supplied with three-phase power that has a frequency of fifty hertz, the motor 154 may have a maximum rated speed of 3000 rpm if the motor 154 is a two pole motor, 1500 rpm if the motor 154 is a four pole motor, 1000 rpm if the motor 154 is a six pole motor, 750 rpm if the motor 154 is an eight pole motor, and 600 rpm if the motor 154 is a ten pole motor.

In some instances, the maximum rated speed of the motor 154 may be greater than a maximum structural speed limit at which the fan wheel 160 is configured or designed to operate. In other words, the fan wheel 160 may not be able to rotate as rapidly as the motor 154. For example, the motor 154 may have a maximum rated speed of 1800 rpm, while the fan wheel 160 may have a maximum structural speed limit of 1500 rpm. In cases in which the maximum rated speed of the motor 154 is greater than the maximum structural speed limit of the fan wheel 160, the area being cooled and/or heated by the fan wheel 160 may experience operational interruptions.

However, operation of the motor 154 may be regulated by the VFD 156. Specifically, the VFD 156 may be used to limit the speed at which the motor 154 may operate. More specifically, the VFD 156 may alter the frequency, electrical potential (i.e., voltage), and/or current of electrical power supplied to the motor 154. In other words, the VFD 156 may draw electrical power with a certain frequency and voltage from a power grid at a certain current, and the VFD 156 may output electrical power to the motor 154 that has a different frequency, voltage, current, or a combination thereof. For example, the VFD 156 may receive three-phase AC electrical power with a frequency of sixty hertz and a voltage of 120 volts at five amperes and output three-phase electrical power with a lower frequency, current, voltage, or a combination thereof to the motor 154. For instance, continuing with this example, the VFD 156 may deliver AC electrical power with the same frequency (i.e., 60 hertz) but a lower voltage (e.g., 110 volts) and a lower current (e.g., four amperes) to the motor 154.

By reducing the frequency, current, voltage, or a combination thereof, of the electrical power that is supplied to the motor 154, the VFD 156 causes the motor 154 to operate at a lower speed. That is, the motor 154 may have an operational speed that is lower than the maximum rated speed due to the power output from the VFD 156 having a lower frequency, current, voltage, or combination thereof, than electrical power supplied from a power grid. Furthermore, the VFD 156 may cause the motor 154 to have an operational speed that is lower than or equal to the maximum structural speed limit of the fan wheel 160. Additionally, as discussed below in more detail with respect to FIG. 6, the VFD 156 may have a frequency output limit, a current output limit, and/or a voltage output limit. These limits may allow for electrical power with frequencies, currents, and/or voltages that do not exceed the frequency, current, and/or voltage limits to be delivered to the motor 154, which may cause the motor 154 to have an operational speed that is less than or equal to the maximum structural speed limit of the fan wheel 160. For instance, adding to the example above in which the VFD 156 draws three-phase AC electrical power with a frequency of sixty hertz and a voltage of 120 volts with a current of five amperes, if the motor 154 is a six pole AC induction motor (which, based on the type of electrical power delivered from the power grid, has a maximum rated speed of 1200 rpm) and the VFD 156 outputs electrical power with the same current (i.e., five amperes) and voltage (i.e., 120 volts) but a reduced frequency of fifty hertz, the operational speed of the motor 154 may be 1000 rpm, which is 200 rpm lower than the maximum rated speed of the motor 154.

It is to be appreciated that the utilization of VFDs 156 may enable use of motors 154 with fewer poles with fan wheels 60 having a maximum structural speed limit less than a maximum rated speed of the motor 154. For instance, a six pole motor with a maximum rated speed of 1200 rpm may be replaced by a four pole motor with a maximum rated speed of 1800 rpm. More specifically, the VFD 156 may be used to limit the electrical power that is supplied to the four pole motor 154 such that the four pole motor 154 has an operational speed equal to or less than 1200 rpm or the maximum structural speed limit of an air supply fan associated with the motor 154. In other words, even though the motor 154 with fewer poles may have a higher maximum rated speed than the motor 154 with more poles, the motor 154 with fewer poles may be used in place of the motor 154 with more poles when the VFD 156 is used to limit the current, voltage, frequency or the electrical power that is supplied to the motor 154 with fewer poles. Moreover, motors 154 with fewer poles may allow wiring with a smaller diameter to be used, which may allow for more space in and around the motor 154.

The fan and motor assembly 152 of FIG. 5, more specifically, may also be referred to as a direct drive plenum fan. In the illustrated embodiment, the fan wheel 160, which may serve as an air intake, supply, exhaust, return, or condenser fan, has a diameter that is greater than forty inches. However, in other embodiments the fan wheel 160 may have a diameter equal to, or less than, forty inches. Additionally, it should be noted the use of VFDs 156 to control motors 154 may also be used by any other suitable type of fans and air handlers. For example, the fan assembly 150 includes a condenser fan VFD 162 and an exhaust/return fan VFD 166, both of which may also limit maximum operational speeds of motors of other fans or air handlers. That is, the condenser fan 162 VFD and the exhaust/return fan 166 VFD may each control the flow of electrical power to motors of fans that have a maximum structural speed limit, such that the motors operate at maximum speeds that are less than or equal to the maximum structural speed limits associated with each of the other fans or air handlers.

Figure 6:
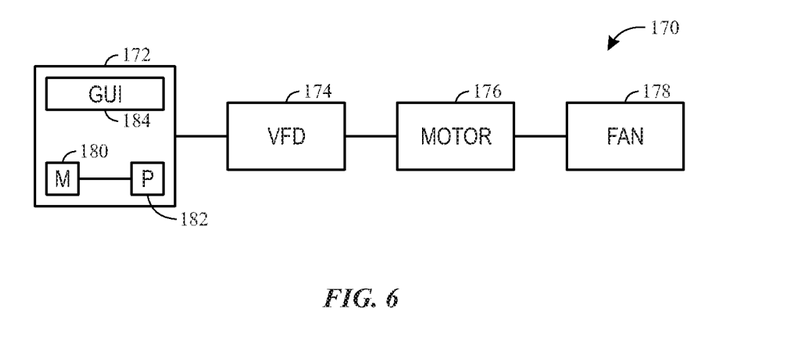
FIG. 6 is a block diagram of a fan assembly that includes a controller that may control electrical power that a VFD delivers to a motor that is coupled to, and drives, a fan assembly or fan, in accordance with embodiments described herein.

The power output of the VFD 156 may be controlled by a controller such that a motor 154 coupled (e.g., physically and/or electrically coupled) to the VFD 156 has an operational speed lower than or equal to a maximum structural speed limit of a fan that is coupled to the motor 154. For instance, FIG. 6 is a block diagram of a fan assembly 170 that includes a controller 172 that may control electrical power that a VFD 174 delivers to a motor 176 that is coupled to, and drives, an air handler or fan 178. The motor 176 may be the same or similar to the motor 154. For instance, the motor 176 may be an AC induction motor (e.g., a two pole, four pole, six pole, eight pole or ten pole AC induction motor) with a maximum rated speed. Moreover, the VFD 174 may be the same as, or similar to, the VFD 156. In other words, the VFD 174 may limit the frequency, current, voltage, or a combination thereof, of the electrical power that is delivered to the motor 176. Additionally, the air handler or fan 178 may be any suitable type of air blower or fan (e.g., plenum fan, condenser fan, supply fan, etc.).

The controller 172 may include a memory 180 and a processor 182. The memory 180 stores instructions and steps written in software code. The processor 182 may execute the stored instructions in response to user input received via a graphical user interface (GUI) 184. More specifically, the controller 172 controls and communicates with the VFD 174 in order to control the electrical power that is delivered to the motor 176. For instance, the controller 172 may control the frequency, current, and voltage of the electrical power that the VFD 174 delivers to the motor 176. In some embodiments, the controller 172 may also be used to control the motor 176 (e.g., modify a speed of the motor 176) and/or the air handler or fan 178 (e.g., control temperature of air delivered by the air handler and/or fan 178 or a speed of the air handler or fan 178).

Although the controller 172 has been described as having the memory 180 and the processor 182, the controller 172 may include a number of other computer system components to enable the controller 172 to control the operations of the VFD 174, motor 176, and/or the air handler or fan 178. For example, the controller 12 may include a communication component that enables the controller 172 to communicate with other computing systems.

The controller 172 may receive user input (e.g., via the GUI 184) indicative of an operational speed of the motor 176, a maximum rated speed of the motor 176, and/or a maximum structural speed limit of the fan 178. Based on the user input, the controller 172, via execution of the instructions stored on the memory 180 by the processor 182, may determine electrical power settings that should be supplied to the motor 176. The controller 172 may also send a command to the VFD 174 to operate in a manner that causes the electrical power the VFD 174 delivers to the motor 176 to satisfy the determined electrical power settings. In other words, a user may input a value (e.g., a maximum structural speed limit of 1000 rpm), and the controller 172 may determine characteristics of the electrical power to deliver to the motor 176, such that the motor 176 will cause the fan 178 to operate at the speed indicated by the user input and send a command to the VFD 174 to limit the electrical power (i.e., limit the frequency, current, voltage, or a combination thereof) that the VFD 174 delivers to the motor 176. Stated differently, the controller 172 may determine a frequency output limit, a current output limit, and/or a voltage output limit based on the user input, and the electrical power settings associated with the electrical power output of the VFD 174 determined by the controller 172 may be equal to or lower than the determined frequency output limit, current output limit, and/or voltage output limit.

Moreover, the user input (e.g., received via the GUI 184) may be related electrical power settings. For instance, the user input may be indicative of a frequency output limit, a current output limit, and/or a voltage output limit associated with the electrical power that is delivered to the motor 176. The controller 172 may use such user input when determining possible electrical power characteristics of the electrical power delivered from the VFD 174 to the motor 176. For instance, if the user input were indicative of a request to set a current output limit of ten amperes, the controller 172 may send commands regarding settings of the VFD 174 that cause electrical power with a current less than or equal to ten amperes to be delivered to the electrical motor 176. It should also be noted that user input associated with electrical power settings may be entered in addition to user input associated with a maximum structural speed limit of the fan 178, an operational speed of the motor 176, and/or a maximum rated speed of the fan 76. Continuing with the example in which user input is indicative of a request to limit the current of the electrical power received by the motor 176 to ten amperes, the user input may also be indicative of a request to set the maximum structural speed limit (e.g., at a value of 1000 rpm). The controller 172 may determine electrical power settings with a current less than or equal to ten amperes that would limit the operational speed of the motor 176 such that the motor 176 would cause the fan 178 to have a speed that is less than or equal to the maximum structural speed limit indicated by the user input. The controller 172 may also send a command to cause the VFD 174 to supply electrical power with such power settings (i.e., power settings that comply with the user input) to the motor 176.

Furthermore, a user may input other power settings into the controller 172, via the GUI 184. For instance, the user may enter a value of the frequency, current, and/or voltage of the electrical power to be delivered to the motor 176. The controller may send a command to the VFD 174 to output electrical power with the settings as indicated by the user input.

The controller 172 may also be password protected. For example, to enter user input (e.g., to change operational settings of the fan assembly 170 or components thereof), a user may first be required to enter an alphanumeric code.

Figure 7:
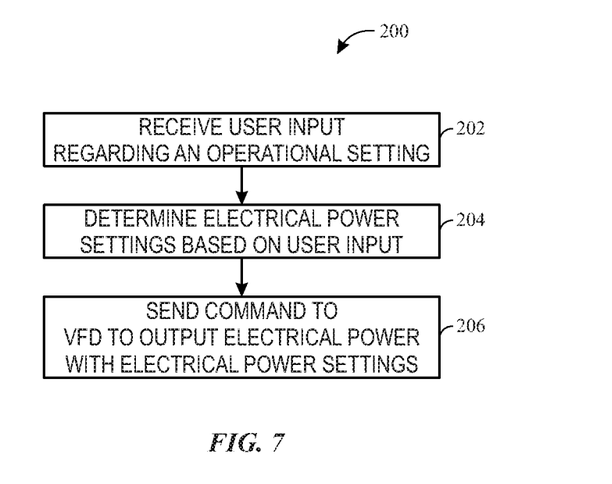
FIG. 7 is a flow chart of a method for controlling a fan assembly, in accordance with embodiment described herein.

With the discussion of FIG. 6 in mind, FIG. 7 is a flow chart of a method 200 for controlling a fan assembly (e.g., fan assembly 170). The method 200 may be performed by processor 182 executing instructions stored on the memory 180. In other words, the method 200 may be performed by the controller 172. Moreover, any suitable processor or application may perform the method 200. Additionally, the method 200 may be performed in any suitable order.

At block 202, a controller (e.g., controller 172) may receive user input (e.g., via GUI 184) regarding one or more operational settings of a fan assembly (e.g., fan assembly 170). Operational settings may include settings related to any components associated with the fan assembly 170 (e.g., an air intake fan). For instance, the operational settings may be a maximum fan structural speed limit of the fan assembly 170 or a fan associated with the air handler (e.g., fan 178), a maximum rated speed of a motor (e.g., motor 176), an operational speed of the motor 176. Additionally, the operational settings may also relate to electrical power that is supplied to the motor 176 that drives the fan assembly 170. For example, the operational settings may also include a frequency output limit, a current output limit, and/or a voltage output limit and/or a specific frequency, current, and/or voltage value of the electrical power to be delivered via a VFD (e.g., VFD 174) to the motor 176.

At block 204, the controller 172 may determine electrical power settings associated with the fan assembly 170 based on the user input. For instance, as explained above in relation to FIG. 6, the user input may be indicative of a request to set one or more operational settings such as the maximum structural speed limit of the fan 178. The controller 172 may determine electrical power settings (e.g., a frequency, current, voltage, a frequency output limit, a current output limit, a voltage output limit, or a combination thereof) that, if used, would cause the motor 176 to have an operational speed that is lower than or equal to the maximum structural speed indicated via the user input.

At block 206, the controller 172 may send a command to the VFD 174 to output electrical power in accordance with the electrical power settings determined by the controller 172 at block 204. Continuing with the example in which the user input is indicative of a request to set a value for the maximum structural speed limit, at block 204, the controller 172 may determine that the operational settings include electrical power with a frequency of sixty hertz, a current of five amperes, and a voltage of 110 volts. At block 106, the controller 172 may send a command to the VFD 174 to supply electrical power with those settings (i.e., a frequency of sixty hertz, a current of five amperes, and a voltage of 110 volts) to the motor 176.

While only certain features and embodiments of the present disclosure have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described (i.e., those unrelated to the presently contemplated best mode of carrying out the present disclosure, or those unrelated to enabling the claimed embodiments). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A fan assembly, comprising:
a fan;
a motor coupled to the fan;
a variable frequency drive (VFD) coupled to the motor, wherein the motor comprises a maximum rated speed, the maximum rated speed is greater than a maximum structural speed limit of the fan;
a user interface configured to receive a user input indicative of the maximum structural speed limit of the fan; and
a controller configured to operate the VFD based on the user input, such that the VFD maintains an operational speed of the motor to be less than or equal to the maximum structural speed limit of the fan by altering an amount of current of electricity supplied to the motor during operation of the motor.

2. The fan assembly of claim 1, wherein the motor is an alternating current (AC) induction motor.

3. The fan assembly of claim 1, wherein the maximum rated speed in rotations per minute (rpm) is determined by determining a product of one-hundred twenty (120) and a frequency of the electricity supplied to the motor and dividing the product by a number of poles that the motor comprises.

4. The fan assembly of claim 1, wherein the motor comprises a four pole motor, and the maximum rated speed is 1800 rpm or 1500 rpm.

5. The fan assembly of claim 1, wherein the fan comprises a diameter of 40 inches.

6. The fan assembly of claim 1, wherein the motor comprises a two pole motor, and the maximum rated speed is 3600 rpm or 3000 rpm.

7. The fan assembly of claim 1, wherein the motor comprises a six pole motor, and the maximum rated speed is 1200 rpm or 1000 rpm.

8. The fan assembly of claim 1, wherein the motor comprises an eight pole motor, and the maximum rated speed is 900 rpm or 750 rpm.

9. The fan assembly of claim 1, wherein the motor comprises a ten pole motor, and the maximum rated speed is 720 rpm or 600 rpm.

10. The fan assembly of claim 1, wherein the controller is configured to operate the VFD, such that the VFD maintains the operational speed of the motor to be less than or equal to the maximum structural speed limit of the fan by altering a voltage of the electricity supplied to the motor during operation of the motor.

11. The fan assembly of claim 1, wherein the controller is configured to operate the VFD, such that the VFD maintains the operational speed of the motor to be less than or equal to the maximum structural speed limit of the fan by altering a frequency of the electricity supplied to the motor during operation of the motor.

12. The fan assembly of claim 11, wherein the controller is configured to operate the VFD, such that the VFD maintains the operational speed of the motor to be less than or equal to the maximum structural speed limit of the fan by altering a voltage of the electricity supplied to the motor during operation of the motor.

13. A fan assembly, comprising:
a fan;
a variable frequency drive (VFD) coupled to an AC induction motor, wherein the AC induction motor comprises a maximum rated speed, the maximum rated speed is greater than a maximum structural speed limit of the fan; and
a controller comprising a user interface configured to receive a user input indicative of one or more operational settings of the fan assembly, the one or more operational settings comprises the maximum structural speed limit of the fan, and the controller is configured to operate the VFD based on the user input to maintain an operational speed of the AC induction motor to be less than or equal to the maximum structural speed limit of the fan by altering an amount of current of electricity supplied to the motor during operation of the motor.

14. The fan assembly of claim 13, wherein the controller is configured to determine electrical power settings associated with the fan assembly based on the user input and to operate the VFD in accordance with the electrical power settings.

15. The fan assembly of claim 14, wherein the electrical power settings comprise a frequency of the electricity, a voltage of the electricity, the amount of current of the electricity, or a combination thereof associated with the AC induction motor.

16. The fan assembly of claim 15, wherein the electrical power settings comprise the frequency of the electricity, the voltage of the electricity, and the amount of current of the electricity.

17. The fan assembly of claim 15, wherein the controller is configured to operate the VFD, such that the VFD maintains the operational speed of the AC induction motor to be less than or equal to the maximum structural speed limit of the fan by altering the voltage and the frequency of the electricity that is delivered to the AC induction motor.

18. The fan assembly of claim 13, wherein the controller is password protected.

19. The fan assembly of claim 13, wherein the AC induction motor comprises a two pole, four pole, or six pole AC induction motor.

20. A method of operating a fan assembly, comprising:
receiving, via a processor, user input indicative of at least one operational setting of the fan assembly, wherein the fan assembly comprises a fan and the at least one operational setting comprises a maximum structural speed limit of the fan;
determining, via the processor, electrical power settings based on the user input; and
sending, via the processor, a command to a variable frequency drive (VFD) to provide electricity with the electrical power settings to an alternating current (AC) induction motor, wherein the AC induction motor is coupled to the fan and comprises a maximum rated speed that is greater than the maximum structural speed limit of the fan, to operate the AC induction motor to maintain an operational speed of the AC induction motor to be less than or equal to the maximum structural speed limit of the fan by altering an amount of current of the electricity supplied to the AC induction motor during operation of the AC induction motor.

21. The method of claim 20, wherein determining the electrical power settings comprises determining a voltage of the electricity, a frequency of the electricity, or the amount of current of the electricity, wherein the processor is configured to operate the VFD, such that the VFD limits the operational speed of the AC induction motor to be less than or equal to the maximum structural speed limit of the fan by altering the voltage or the frequency of the electricity.

22. The method of claim 20, wherein the at least one operational setting comprises a voltage of the electricity, a frequency of the electricity, or the amount of current of the electricity.

23. The method of claim 20, wherein the AC induction motor comprises a two pole, four pole, or six pole AC induction motor.

* * * * *